United States Patent [19]
Wu

[11] Patent Number: 6,055,225
[45] Date of Patent: Apr. 25, 2000

[54] RING ARCHITECTURE FOR QUAD PORT BYPASS CIRCUITS

[75] Inventor: Bin Wu, San Jose, Calif.

[73] Assignee: Hewlett-Packard Company, Palo Alto, Calif.

[21] Appl. No.: 08/867,319

[22] Filed: Jun. 2, 1997

[51] Int. Cl.[7] .................. H04J 1/16; H04J 3/14; G06F 11/00; G08C 15/00
[52] U.S. Cl. ............................. 370/222; 370/241
[58] Field of Search ................. 714/4; 370/221, 370/222, 225–228, 241, 248, 249; 711/114, 100

[56] References Cited

U.S. PATENT DOCUMENTS

| | | |
|---|---|---|
| 4,677,614 | 6/1987 | Circo .......................................... 370/86 |
| 5,235,689 | 8/1993 | Baker . |
| 5,271,014 | 12/1993 | Bruck et al. . |
| 5,280,607 | 1/1994 | Bruck et al. . |
| 5,457,556 | 10/1995 | Shiragaki . |
| 5,487,155 | 1/1996 | Drewry . |
| 5,490,007 | 2/1996 | Bennett . |
| 5,513,313 | 4/1996 | Bruck et al. . |
| 5,535,035 | 7/1996 | DeFoster . |
| 5,638,518 | 6/1997 | Malladi . |
| 5,717,796 | 2/1998 | Clendening .............................. 385/24 |
| 5,812,754 | 9/1998 | Lui . |
| 5,841,997 | 11/1998 | Bleiweiss . |

FOREIGN PATENT DOCUMENTS

| | | |
|---|---|---|
| 0869641A2 | 10/1998 | European Pat. Off. . |
| 19526172C1 | 1/1997 | Germany . |
| 2147770 | 5/1985 | United Kingdom . |
| 88/07793 A1 | 10/1988 | WIPO . |
| WO88/07793 | 10/1988 | WIPO . |
| WO98/28882A1 | 7/1998 | WIPO . |

OTHER PUBLICATIONS

Fairchild Semiconductor Corporation, "DM74ALS157/DM74ALS158 Quad 1 of 2 Line Data Selector/Multiplexer", Feb. 1998.

*Primary Examiner*—Douglas W. Olms
*Assistant Examiner*—David R Vincent

[57] ABSTRACT

A floating clock data recovery circuit may be positioned anywhere in a chain of nodes. An N+1 length series of port bypass circuits are connected such that the output port of one is connected to the input of the next port bypass circuit. N is the number of desired nodes. One of the series of port bypass circuits will be used to "control" the positioning of the signal conditioning circuitry. When the control PBC is in operation, the loop is "broken" at that node. As a result, the signal conditioning circuitry may be placed anywhere in the chain of nodes.

11 Claims, 3 Drawing Sheets

RING ARCHITECTURE FOR QUAD PORT BYPASS CIRCUITS

FIELD OF THE INVENTION

The invention is directed towards the field of network architecture, in particular towards communication networks for distributed systems.

BACKGROUND

The Fibre Channel (FC) standard provides for three different communication modes: point to point, switched, and arbitrated loop (FC-AL) configurations. FC-AL is rapidly becoming the dominant configuration, especially as a mass storage (disk drives) solution. FC-AL has the ability to connect more than one hundred FC nodes (each of which, e.g., can be a disk drive), while at the same time remains quite simple due to the omission of the switch.

FIG. 1 shows a prior art network in which a computer is connected to a redundant array of inexpensive disks (RAID) box through FC-AL. Each disk drive as a "node" of the arbitrated loop architecture.

A port bypass circuit (PBC) is used for each node on the loop or two PBCs may be used when dual-loops are required for redundancy. The PBCs are coupled in a loop network architecture. Each node is coupled to the network through one of the PBCs. As shown by the ellipsis in FIG. 1, the number of PBCs of the network may be any suitable value, to accommodate the desired number of nodes. A PBC takes a FC node into and out of loop operation.

FIG. 2 is a prior art block diagram for the network shown in FIG. 1. Each PBC is shown as including a buffered input, a buffered output, and a selector such as a conventional 2×1 multiplexer. A control input to the selector has two logic states. In accordance with known principles of digital logic, one of the two logic states is arbitrarily designated as "asserted." For instance, a high TTL voltage, or logic 1, may be designated the "asserted" state. The selector works, as per the known characteristics of multiplexers, by providing one of the two inputs at the output, which one being determined by the logic state of the control signal.

As per common practice, each multiplexer is shown schematically as a trapezoid having two parallel sides, one wider than the other. The wider (input) side receives two input signals, and the narrower (output) side provides an output signal. A control signal is received at an input at one of the two non-parallel sides of the trapezoid. When the Ctrl signal of a particular PBC is asserted, the upstream signal is received by the corresponding FC node through the Out connection, and the output from the FC node is passed on to the next node through the In input and the multiplexor. When the Ctrl signal is not asserted, the corresponding node only monitors the upstream data, but does not transmit any data to the downstream node. The device (eg. disk drive) coupled to the node is effectively out of the arbitrated loop. This bypass function allows operation of the loop when a node is malfunctioning, non-existent, or taken off line for maintenance. When many PBCs are required, more than one may be placed on a single chip to save board space and reduce cost. Unfortunately, jitter accumulation of the high speed digital signal increases proportionally to the number of PBCs in the loop. A high speed signal at 1.06 Gigabits/second is easily corrupted, by going through PBCs, board traces, connectors etc. The periodic signal conditioning circuit such as a clock data recovery unit (CDR) as a signal conditioning element along the loop is needed to improve signal integrity and therefore system reliability.

One question for the circuit designer is where to position the clock data recovery unit. The placement will vary depending upon the signal quality entering the network. For example, the CDR should be placed in position 1 (shown in FIG. 2) if the incoming signal is of poor quality or perhaps after position 4 if a long cable needs to be driven. Current integrated solutions, that is, integrated circuits or modules including the PBCs, the CDR, and the connections between them, offer a fixed position solution, e.g., the CDR always preceding position 1. It would be beneficial for signal conditioning to be flexibly positioned within a network.

SUMMARY OF THE INVENTION

A floating clock data recovery circuit may be positioned anywhere in a chain of nodes. An N+1 length series of port bypass circuits are connected such that the output port of one is connected to the input the next port bypass circuit. N is the number of desired nodes in the loop. The signal conditioning circuitry is connected to the N+1 length series such that a ring is formed.

One of the series of port bypass circuits will be used to "control" the positioning of the signal conditioning circuitry. When the control PBC is in operation, the loop is "broken" at that node. As a result, the signal conditioning circuitry may be placed anywhere in the chain of nodes.

DETAILED DESCRIPTION OF THE DRAWINGS

Figure 1:
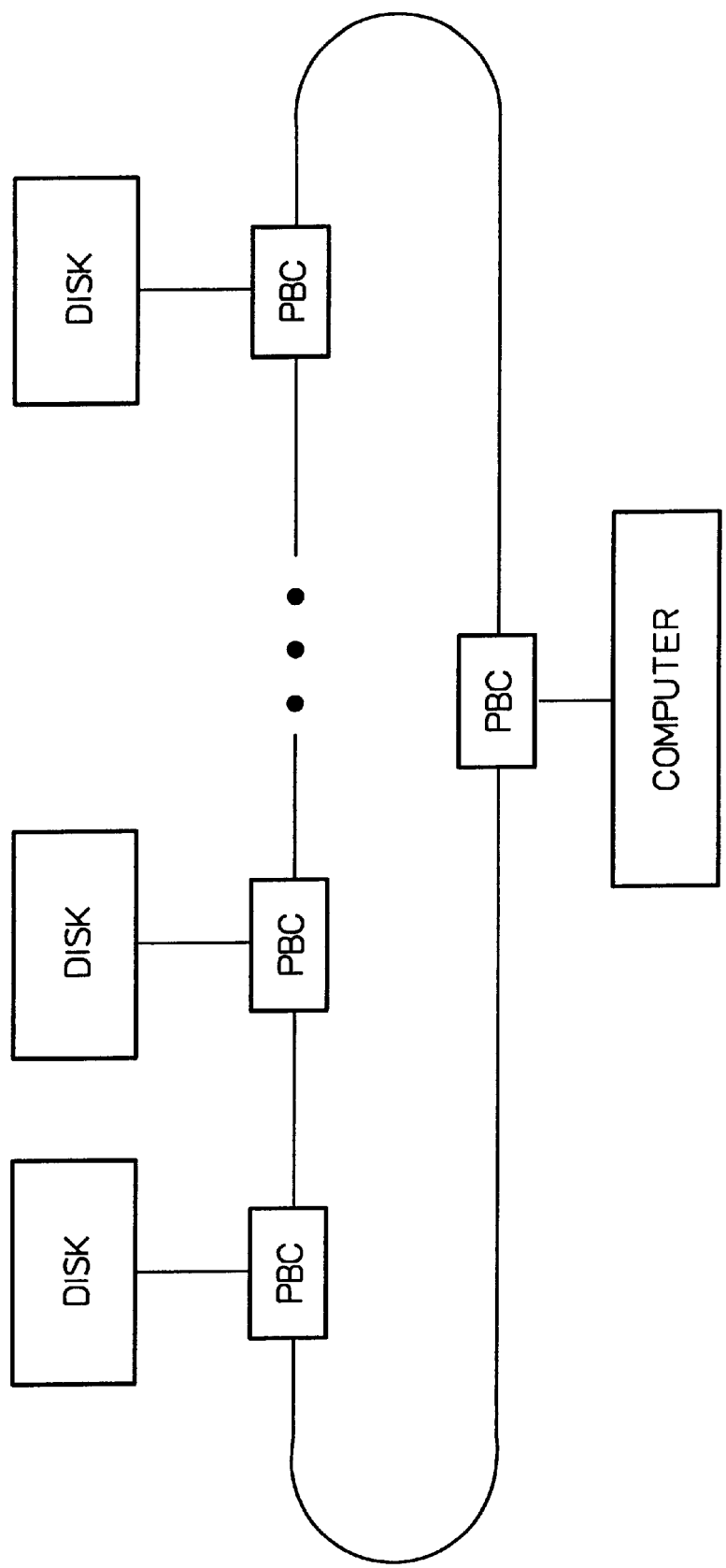
FIG. 1 illustrates a prior art ring network.
Figure 2:
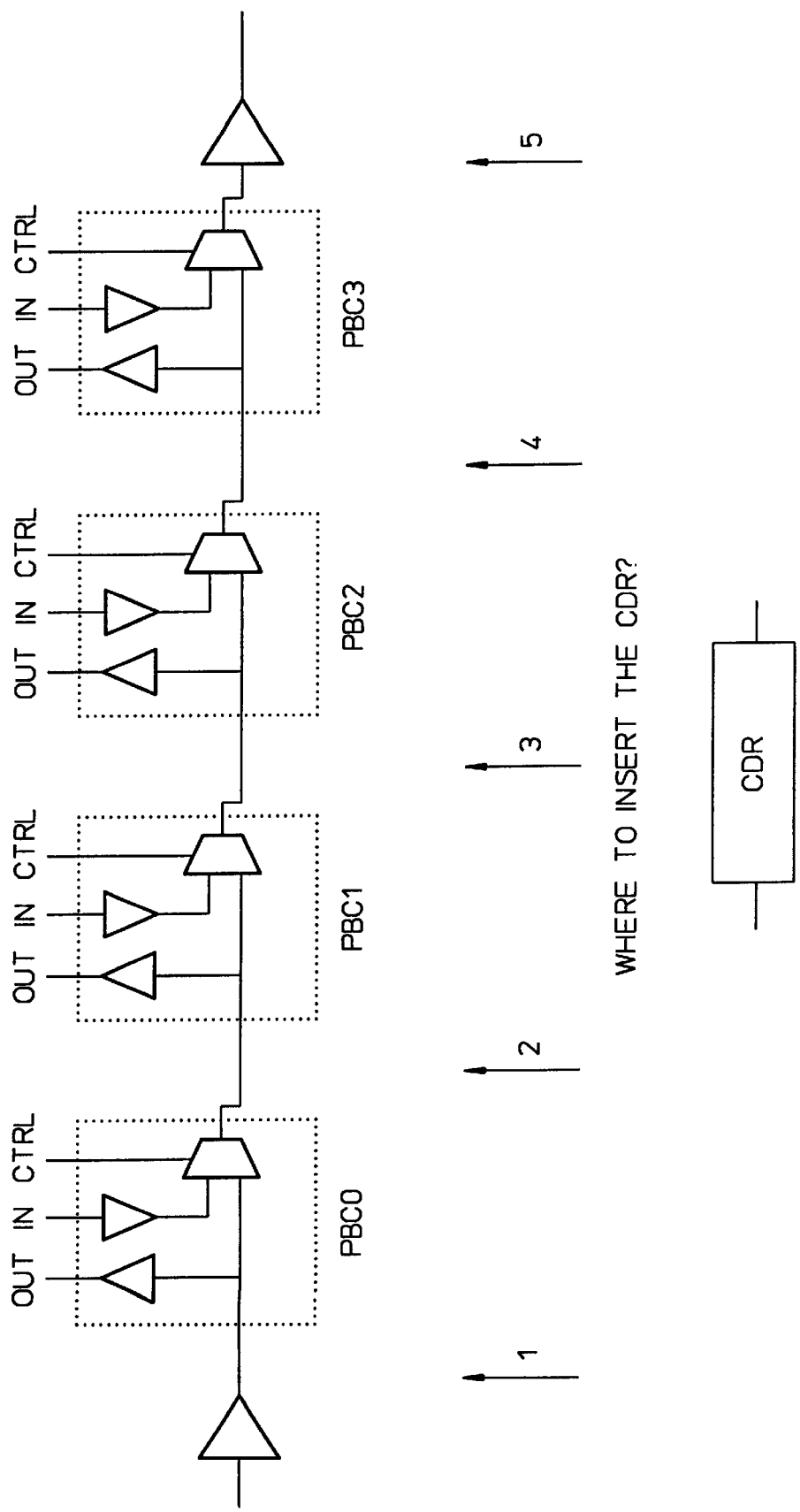
FIG. 2 is a block diagram illustrating the port bypass circuits used in the prior art network shown in FIG. 1.
Figure 3:
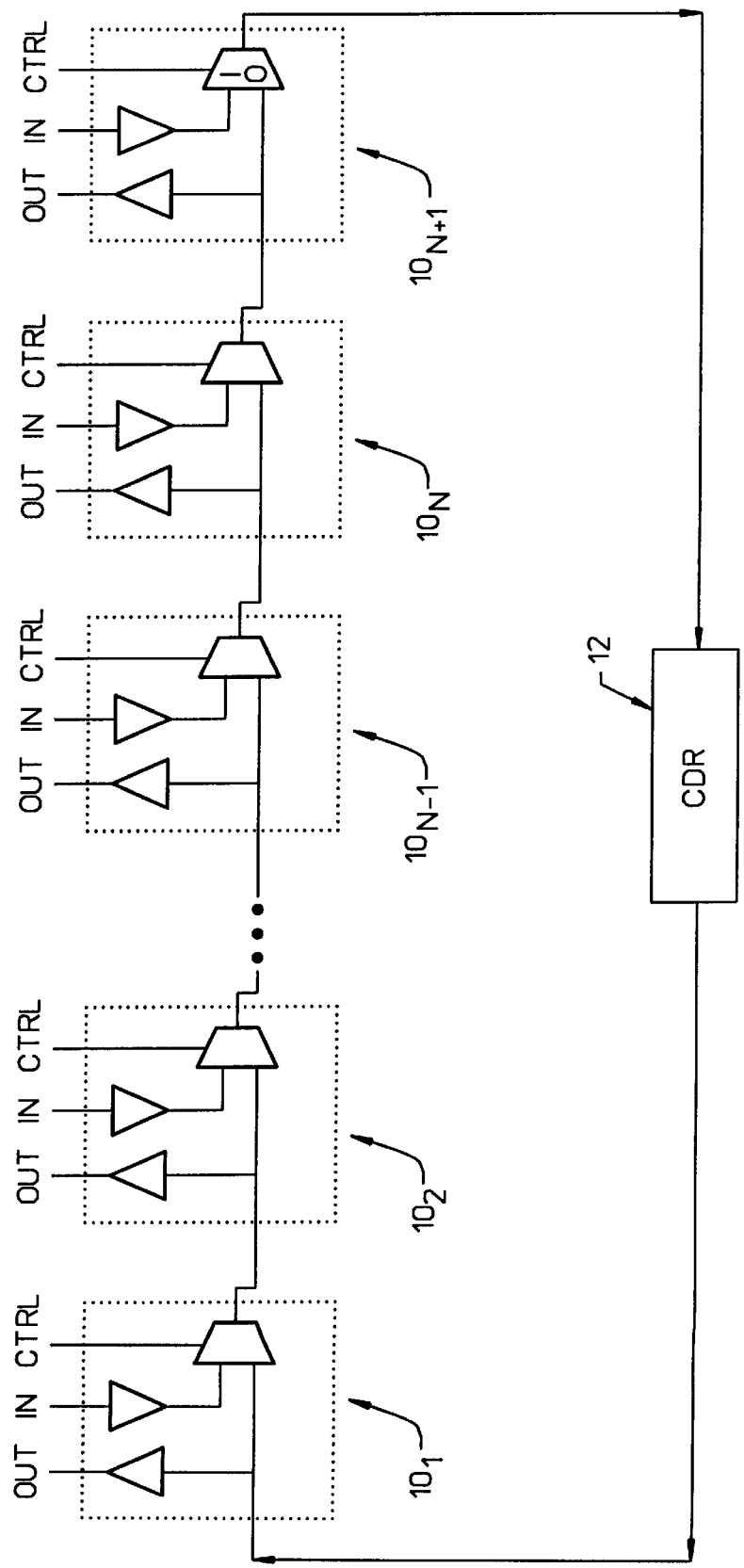
FIG. 3 is a port bypass network of the present invention.

This invention approaches the location problem in a very elegant and straightforward manner. As depicted in FIG. 3, an N+1 length series of port bypass circuits $10_1$, $10_2$, $10_3$, . . . $10_{n+1}$, i.e. 2 by 1 multiplexors, and a signal conditioning circuit 12, i.e. clock data recovery circuitry, are arranged in a ring. N is the number of desired nodes. The series of port bypass circuits are connected such that the output port of one is connected to an input the next port bypass circuit. The output of the last port bypass circuit is the input to the signal conditioning circuitry 12. The output of the signal conditioning circuitry 12 is an input to the first port bypass circuit $10_1$ in the series.

The signal conditioning circuitry 12 may be positioned by "breaking" the ring in any one of the N+1 locations by asserting the control signal Ctrl of the corresponding port bypass circuit $10_x$. This port bypass circuit behaves as the control input/output buffer, while the remaining port bypass circuits retain the standard port bypass function.

The port bypass circuits and the signal conditioning circuitry may be placed on a monolithic substrate. The signal conditioning circuitry may have any desired function, e.g. a clock data recovery circuit, an equalizer, or a quantizer.

What is claimed is:

1. A circuit comprising:
   an N+1 length series of selectors, the series having an input and output, where N is a desired number of nodes, each selector has at least two inputs and an output, wherein the output of each selector is connected to one of the two inputs of the next selector;
   a signal conditioning circuit, connected to the input and the output of the N+1 length series; and
   wherein the signal conditioning circuit is positioned by asserting a control line of one of the selectors in the N+1 length series.

2. A circuit, as defined in claim 1, wherein the signal conditioning circuit is a clock data recovery circuit.

3. A circuit, as defined in claim 2, wherein N=4.

4. A circuit, as defined in claim 1, wherein the N+1 length series is on a monolithic substrate.

5. A circuit, as defined in claim 4, the signal conditioning circuit comprising a clock data recovery circuit.

6. A circuit, as defined in claim 5, wherein N=4.

7. A circuit, as defined in claim 1, wherein the selector is a two input multiplexor.

8. A circuit, as defined in claim 7, wherein the N+1 length series is on a monolithic substrate.

9. A circuit, as defined in claim 8, the signal conditioning circuitry comprising a clock data recovery circuit.

10. A circuit comprising:

a set of selectors arranged successively into a sequence from first to last, each selector having first and second inputs, a control input, and an output, the output of each selector being coupled to the first input of the next successive one of the selectors, each selector including means for coupling its first input to its output if the control signal is not asserted, and for couplings its second input to its output if the control signal is asserted; and a signal conditioning circuit coupled to the output of the last selector and to the first input of the first selector, to form a physical loop topology;

wherein, when a control line to a chosen one of the selectors is asserted, the output of the immediately preceding selector is decoupled from the output of the chosen selector to form a logical series topology, the second input of the chosen selector and the output of the immediately preceding selector form the input and output of the logical series topology; and wherein, the logical series topology includes a logical series of the remaining selectors, the signal conditioning circuit being positioned at a desired point within the logical series of the remaining selectors.

11. A circuit for coupling a desired number N of devices to another device to form a physical loop topology, and for positioning a signal conditioning circuit at a desired point within the physical loop topology, the circuit comprising:

an N+1 length series of nodes in a physical loop topology, each node including a selector, each selector having two inputs and an output, wherein the output of each selector but one is connected to one of the two inputs of the next selector;

a signal conditioning circuit, connected to the output of the one selector and to the one of the two outputs of the selector following the one selector; and N+1 interfaces, each interfaces including an input and an output coupled to the one input and to the other input of a respective one of the selectors;

wherein the signal conditioning circuit is positioned by (i) selecting one of the N+1 selectors as the interface to the other device within the physical loop topology, the selected one of the selectors being selected based on its position, in the topology, relative to that of the signal conditioning circuit, and (ii) asserting a control line of the selected one of the selectors to use the selected one of the selectors as the beginning of a series topology.

* * * * *